Jan. 13, 1925.
W. HAHNEMANN
RECEIVING DEVICE FOR SUBMARINE SOUND SIGNALS
Original Filed Oct. 28, 1915
1,523,016
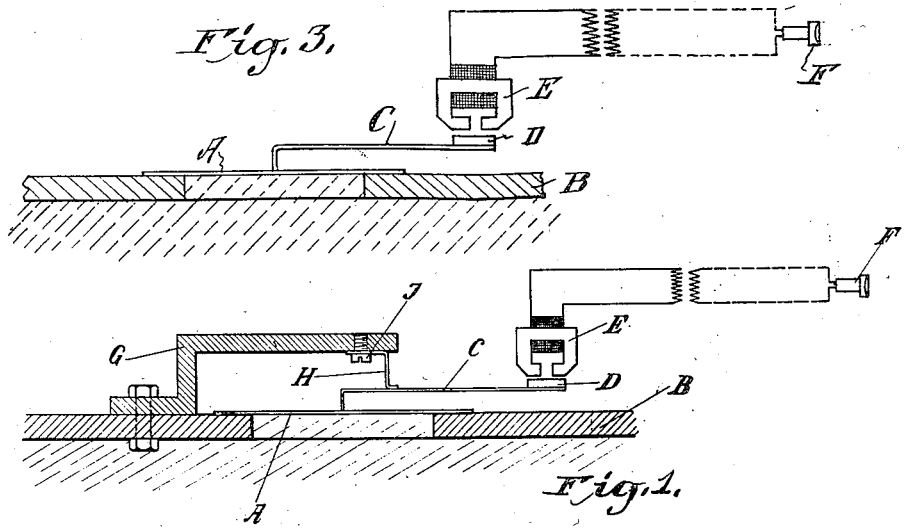
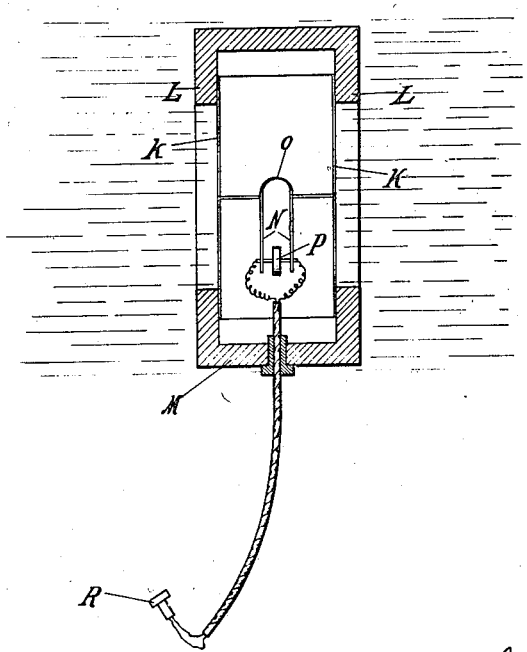
Inventor Patented Jan. 13, 1925.

1,523,016

UNITED STATES PATENT OFFICE.

WALTER HAHNEMANN, OF KITZEBERG, GERMANY, ASSIGNOR TO SIGNAL GESELL-SCHAFT MIT BESCHRÄNKTER HAFTUNG, OF KIEL, GERMANY.

RECEIVING DEVICE FOR SUBMARINE SOUND SIGNALS.

Application filed October 28, 1915, Serial No. 58,509. Renewed July 31, 1923.

*To all whom it may concern:*

Be it known that I, WALTER HAHNEMANN, a subject of the German Emperor, and residing at Kitzeberg, near Kiel, county of Schleswig-Holstein, State of Prussia, have invented certain new and useful Improvements in Receiving Devices for Submarine Sound Signals, for which I have filed an application in Germany, October 26, 1914, of which the following is a specification.

The invention relates to submarine sound-signal receiving devices in which the sound waves arriving in the water are rendered perceptible by means of an electric, mechanical or optical indicator. It is known that on the radiation of sound waves in water the amplitudes of force of the excited mass of water are, on account of the incompressibility of the water, great while the amplitudes of oscillation are very small. Accordingly the parts of any receiver which impinge directly on the water, for example the outer skin of a ship or a membrane secured on or in said outer skin, are, since they vibrate according to the amplitudes of oscillation of the transmitting medium, excited to very small oscillations. But it has been found from practical observations just as from theoretical reflexions, that such small amplitudes of oscillation are unsuitable and insufficient for operating in an economical manner any electrical detector or a mechanical or optical indicator.

The invention consists in introducing between the member that receives the acoustic energy from the water, for example the outer skin of a ship, and the member that transforms the received acoustic energy into the form of energy to be observed, a system by means of which the small amplitudes of oscillation of the molecules of the water and of the complying receiving member may be transformed into great amplitudes of oscillation before they reach the indicator.

Systems complying with said requirements are in themselves known in practice. They may be adapted to the nature of the actual receiving member and of the indicator, and consequently be manifold in form and arrangement. In order to obtain the transmission ratio, levers are advantageously used, for example, flexible levers, such as springs, the arms of which are so clamped as to represent levers of different arm lengths. Such a lever as is used in my construction being, contrary to custom, not jointed to its fulcrum and at its operative ends by a pivotal joint, but by anchorage, I shall hereafter in the specification and claims apply the term "jointless lever" to this element of my improved device.

By arranging the receiving devices according to the invention the economy and the clearness of the receiving devices are in a high degree increased. A further improvement may still be obtained by tuning the transmission member or the receiving member to the arriving sound or by tuning and using in concert both of the members.

In the accompanying drawing I have represented by way of example two embodiments of the invention. Fig. 1 represents a receiving device the transmitting element of which consists of a jointless lever; Fig. 2 is a similar view of a form in which the transmitting member is shown as a spring-tongue and Fig. 3 is a modification of the form shown in Fig. 1, in which, however, the spring support H for the lever is omitted.

In the form shown in Fig. 1 A is a diaphragm which is put tightly over an opening of the ship's side B. To the interior side in the diaphragm A, the one end of a bar or lever C is attached, the free end of which carries the armature D of an electromagnetic transmitter E the sound of which is received in the telephone F. A support G attached to the ship's side carries a spring H which is secured to the support by means of a screw J and influences the bar C near its bending point. By means of said spring H which is of secondary consideration for the effect of the receiver and may be omitted in a given case (see Fig. 3), the falling off of the armature D from the electromagnetic transmitter is, in the form of the represented example, accelerated.

The sound waves arriving in the water cause the diaphragm A to vibrate and the vibrations thus are imparted to the bar C. The latter acts as a jointless lever of the second order, the fulcrum of which is situated near that end of the bar C which is secured to the diaphragm A. The small amplitudes forced upon the fixed short arm of the lever are thus transformed by the free longer arm of the lever into greater amplitudes of oscillation nearly proportional to the difference of length of the lever arms.

In the form illustrated in Fig. 2 the two diaphragms K, K are attached in parallel to the longitudinal sides L, L of an immersible case M filled with air. Between the diaphragms K, K a spring-clip N is so suspended that each of its arms forms a rigid lever of individual throw. The curved portion O of the clip N is reduced in its cross section, for the purpose of increasing the springiness. Between the free ends of the clip N an indicator, for example a microphone P, of the same type or another detector is arranged which is connected to a receiver R. The operation of this form is analogous with that of the form shown in Fig. 1.

The modification Fig. 3 is substantially similar to that shown in Fig. 1, except that it shows the form of the invention in which the fulcrum support H (Fig. 1) for the jointless motion amplifying element is omitted, being, as has been pointed out at the beginning, not essential for the effective operation in certain cases. In this particular modification the location of the fulcrum is determined by the relation of the two masses located at the ends of lever C. In order to bring the fulcrum close to the receiving element so as to cause amplification of the latter's motion at the indicating element, the mass at the receiving end of the lever, i. e. at the end fastened to the diaphragm A, should be large, compared with the mass at the other end of the lever. This effect is easily obtained by virtue of the fact that the mass of the diaphragm A plus the mass of the sound propagating medium (water) directly in contact in it, and which oscillates therewith, is very large compared with the mass D located at the other end of lever C. Thus the fulcrum will be located very close to the receiving end of lever C and a large motion amplitude will result at D for a comparatively small amplitude of the diaphragm A.

What I claim is:

1. A receiving device for submarine sound signals comprising a receiving diaphragm directly in contact with the sound carrying water, an indicator and a jointless lever element, said element being connected between the receiving diaphragm and the indicator, and being connected to said indicator at a point having an amplitude larger than that existing at the point at which the element is connected to said receiving diaphragm.

2. A receiving device for submarine sound signals comprising a receiving diaphragm directly in contact with the sound carrying water, an indicator and a jointless lever element, said element being connected between the receiving diaphragm and the indicator, and being connected to said indicator at a point having an amplitude larger than that existing at the point at which the element is connected to said receiving diaphragm, said element adapted to positively transmit forced oscillations, imparted to it by said receiving diaphragm in amplified form to the indicator.

3. A receiving device for submarine sound signals, comprising a plurality of receiving diaphragms each directly in contact with the sound carrying water, indicating means and a jointless lever element connected between each of said diaphragms and said indicating means, each of said diaphragms being connected to its lever element at a suitable distance from the fulcrum thereof, each of said lever elements being connected to said indicating means at a point further remote from its fulcrum than the point at which it is connected to its diaphragm, to cause the small energy amplitude received at said diaphragm to be transformed into large motion amplitudes before they are transmitted to the indicating means.

4. A receiving device for submarine sound signals, comprising a plurality of receiving diaphragms each directly in contact with the sound carrying water, indicating means and a jointless lever element connected between each of said diaphragms and said indicating means, each of said diaphragms being connected to its lever element at a suitable distance from the fulcrum thereof, each of said lever elements being connected to said indicating means at a point further remote from its fulcrum than the point at which it is connected to its diaphragm, to cause the small energy amplitudes received at said diaphragms to be transformed into large motion amplitudes and to be positively transmitted to the indicating means.

5. A receiving device for submarine sound signals, comprising in combination a sound wave receiving element directly in contact with the sound carrying water, an indicating element, and a single jointless motion amplifying element interposed between said two first-named elements and having points of relatively small and relatively large amplitude of motion, said amplifying element being adapted to directly transmit in amplified form the motion of the receiving element to the indicating element, and said amplifying element being connected with the receiving element at a point of relatively small amplitude and with the indicating element at a point of relatively large amplitude.

In testimony whereof I affix my signature in presence of two witnesses.

WALTER HAHNEMANN.

Witnesses:
 JULIUS ROYKE,
 BRUNO KAHLE.